United States Patent [19]
Givens

[11] 3,825,753
[45] July 23, 1974

[54] METHOD FOR PROVIDING A NATURAL GAMMA-RAY LAG IN CONJUNCTION WITH ASSAY OPERATIONS WITHIN A BOREHOLE

[75] Inventor: Wyatt W. Givens, Dallas, Tex.

[73] Assignee: Mobil Oil Corporation, New York, N.Y.

[22] Filed: Oct. 6, 1972

[21] Appl. No.: 295,647

[52] U.S. Cl................. 250/265, 250/269, 250/270
[51] Int. Cl............................................. G01v 5/00
[58] Field of Search ............ 250/264, 265, 269, 270

[56] References Cited
UNITED STATES PATENTS
3,247,381  4/1966  Caldwell et al..................... 250/270
3,420,998  1/1969  Mills, Jr........................ 250/265 X Primary Examiner—Archie R. Borchelt
Attorney, Agent, or Firm—A. L. Gaboriault; George W. Hager, Jr.

[57] ABSTRACT

A borehole logging tool is utilized to assay the formations surrounding the borehole by operating a pulsed neutron source to irradiate the formations with bursts of neutrons. A neutron detector monitors the delayed neutrons produced by the formations upon irradiation by the neutrons, and a gamma-ray detector monitors the delayed gamma rays produced by the formations upon irradiation by the source neutrons. The gamma-ray detector is also operated between assay operations to detect the natural gamma radiation of the formations being assayed.

3 Claims, 1 Drawing Figure

PATENTED JUL 23 1974
3,825,753
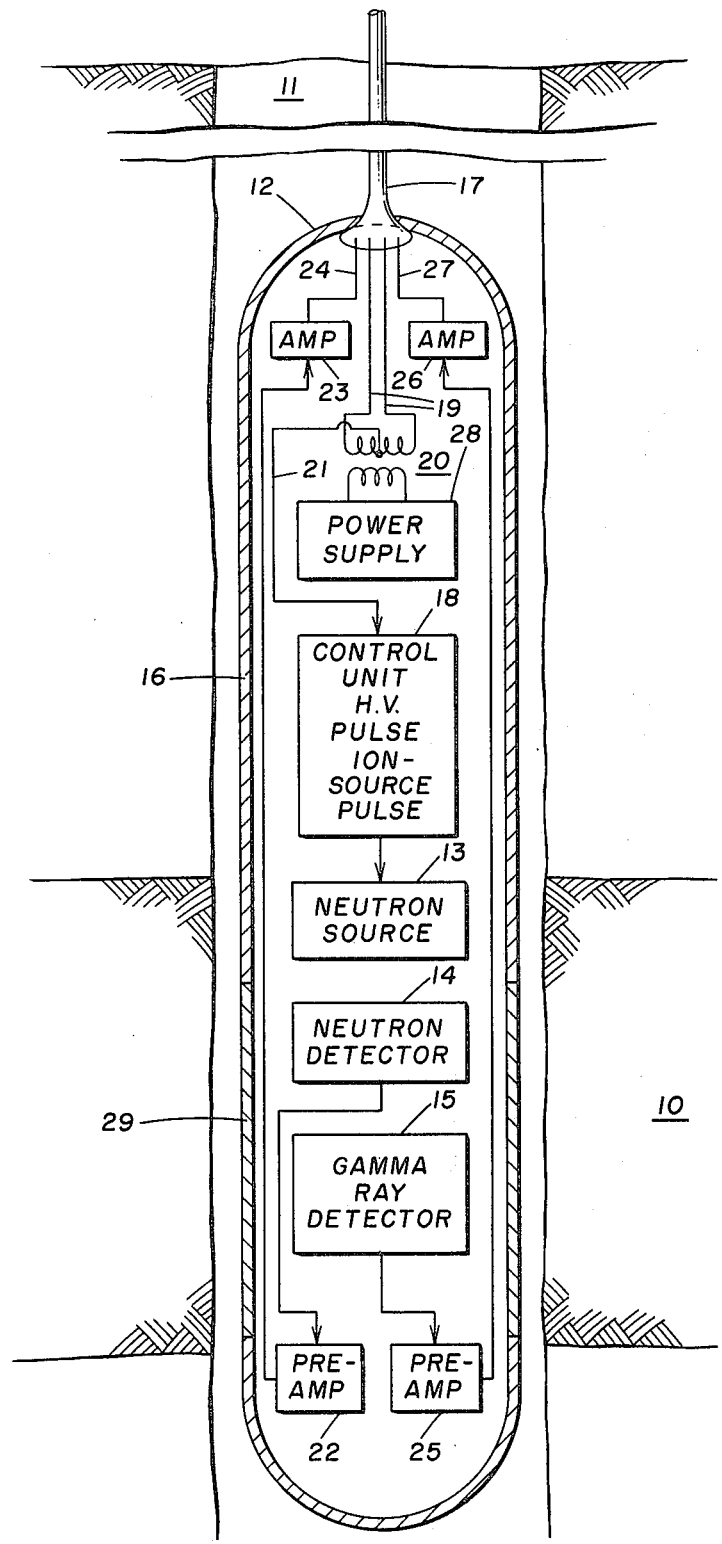

METHOD FOR PROVIDING A NATURAL GAMMA-RAY LAG IN CONJUNCTION WITH ASSAY OPERATIONS WITHIN A BOREHOLE

BACKGROUND OF THE INVENTION

In the art of radioactive well logging, a uranium assay tool is lowered into the borehole to a level of a formation to be assayed. The assay operation is then carried out by cyclically operating a neutron source so as to irradiate the formation with bursts of neutrons, the time between each burst being sufficient to allow the neutrons from the source to disappear and to allow the delayed neutrons emitted by the formation to arrive at and be detected by a neutron detector. In addition, delayed gamma rays are detected for the purpose of monitoring the output of the neutron source. A gamma-ray detector is located within the borehole tool sufficiently close to the neutron source so as to monitor, during the assay operation, delayed gamma rays produced from the reaction:

$$O^{16}(n,p)N^{16} \xrightarrow{\beta^-} O^{16} + \gamma. \quad (1)$$

As the oxygen content of most formations is generally relatively constant, the gamma-ray response of the detector is representative of the quantity of neutrons produced by the neutron source and may, therefore, be used to monitor the output of the neutron source.

In another type of radioactive logging system the intensity of gamma rays emitted naturally from the formation surrounding the borehole is logged. In such a system, a logging tool includes a gamma-ray detector which detects the natural gamma rays from the formation as the tool is lowered through the borehole.

It has been a common practice in well logging operations to select a formation of interest to be assayed from a natural gamma-ray log which has previously been produced by lowering a separate logging tool including a gamma-ray detector through the borehole and recording the natural gamma radiation detected. The assay tool, including the neutron source, neutron detector, and gamma-ray detector, is then lowered through the borehole until the level of the formation to be assayed, as indicated on the natural gamma-ray log, is reached.

It has been a problem in such operations to obtain accurate depth measurements of the assay tool for correlating with the natural gamma log.

One method previously used to obtain the depth measurements of the assay tool has been to record the rotation of a depth-measuring sheave over which the logging cable of the assay tool passes as it is lowered through the borehole to obtain depth measurements. This method can be inaccurate due to stretching of the supporting cable as the assay tool is lowered through the borehole.

A still further method has been to locate a second gamma-ray detector within the assay tool itself to produce a natural gamma-ray log as the assay tool is lowered through the borehole. This second gamma-ray detector has to be spaced sufficiently far from the neutron source to prevent either neutrons from the source or neutrons which are scattered within the formations during assay operations from having any adverse effects upon the natural gamma-ray log.

SUMMARY OF THE INVENTION

In accordance with the invention, a borehole assay tool is provided which will detect, in one logging trip through the borehole, delayed neutrons, delayed gamma rays, and natural gamma rays and having the advantage that the natural gamma-ray detector does not have to be spaced from the neutron source.

In one aspect, a borehole logging tool includes a neutron source for carrying out assay operations. The neutron source is cyclically operated to produce bursts of neutrons for irradiating the formations surrounding the borehole. A neutron detector is located within the tool for detecting delayed neutrons emitted by the formations upon irradiation by the source neutrons. A gamma-ray detector is located within the tool sufficiently close to the neutron source so that it detects the delayed gamma rays emitted by oxygen, $O^{16}$, in the formations upon irradiation by the neutrons. Since most formations contain oxygen in a relatively plentiful and constant amount, the delayed gamma rays may be detected as a representative measure of the neutron source output. During periods wherein assay operations are not being carried out, the gamma-ray detector is again operated to detect the natural gamma radiation of the formations which have been or are to be assayed. From the output of the gamma-ray detector during these periods, a natural gamma-ray log is produced. To permit the running of the natural gamma-ray log between the running of each assay operation, the material comprising at least a portion of the housing adjacent the neutron detector and gamma-ray detector has a dual characteristic. As to the first characteristic, the material may be essentially transparent to the passage of both neutrons and gamma rays. The material must also have a second characteristic that, upon exposure to neutrons during assay operations, no radioisotopes will be produced by such material which, upon decay with their characteristic half life, would produce gamma rays which would interfere with the detection of the natural gamma rays being emitted by the formation in the period between assay operations.

BRIEF DESCRIPTION OF THE DRAWING

The FIGURE illustrates a borehole tool and recording system.

DETAILED DESCRIPTION OF THE INVENTION

Referring to the FIGURE, the formation to be investigated or assayed is shown at 10. It is traversed by a borehole 11. Assaying is carried out by lowering an assay tool 12 into the borehole to the level of the formation 10. The assay tool 12 comprises a housing 16 which is suspended in the borehole 11 by means of a logging cable 17 and in which the neutron source 13, the neutron detector 14, and the gamma-ray detector 15 are located. In one embodiment, the neutron source 13 is an accelerator-type, 14-Mev source which comprises a neutron generator tube having a target and an ion source. Pulsing is carried out by applying a high-voltage pulse to the ion source and simultaneously a negative-going pulse to the target. The ion-source pulse is generated by control unit 18 and applied to the ion source. In addition, the control unit generates a negative pulse which is applied to the target. A trigger pulse generated uphole is applied by way of conductor 19, transformer 20, and conductor 21 to periodically actuate the control unit 18 for the production of high-voltage and ion-source pulses for pulsing the neutron generator tube. The output of the neutron generator tube is a burst of neutrons spaced in time for irradiation of the formation 10. In formations containing fissionable material, such as uranium, many of the neutrons will induce fission within the material with the resulting production of delayed fission neutrons. In addition to uranium, thorium may produce fission neutrons. However, the fission cross section of thorium is much smaller than that of natural uranium. Hence, the effect of thorium is insignificant except at very high concentrations.

When a 14-Mev source is used, oxygen in the formation, however, will produce a neutron background level which contributes to the neutrons detected by the neutron detector. When oxygen-17 is irradiated with neutrons of energy greater than 7.93 Mev, the following reaction takes place:

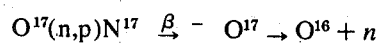

$$O^{17}(n,p)N^{17} \xrightarrow{\beta^-} O^{17} \rightarrow O^{16} + n \qquad 2$$

The resulting neutrons produced have a maximum energy of about 2.2 Mev. Since the half life of the beta decay is of the order of 4.14 seconds, these neutrons are produced within the same time period that the shorter-lived fission groups from uranium are produced. Thus, they contribute to the count obtained by the neutron detector.

Both the delayed fission neutrons and the delayed neutrons from the oxygen-17 are detected by the thermal neutron detector 14 which produces an output pulse for each neutron detected. The output of the neutron detector is applied uphole by means of a preamplifier 22, amplifier 23, and conductor 24.

The gamma-ray detector 15 is utilized to obtain an indirect measure of the output from the pulsed neutron source 13. It is a conventional gamma-ray detector which detects the delayed gamma rays emitted from oxygen in the formations when irradiated with neutrons from the 14-Mev neutron source. The reaction is:

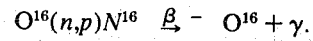

$$O^{16}(n,p)N^{16} \xrightarrow{\beta^-} O^{16} + \gamma. \qquad 3$$

Nitrogen-16 decays by beta emission with a half life of 7.14 seconds. The gamma rays emitted following beta decay predominantly are 6.14-Mev gamma rays and some 6.92- and 7.12-Mev gamma rays. The number of these gamma rays emitted is proportional to the number of neutrons produced by the source. The oxygen in the formations is plentiful and relatively constant. In this respect, it has been found that most formation matrices contain about fifty percent oxygen, with the change in oxygen content between formations being about seven to eight percent. Thus, one may detect the delayed gamma rays from oxygen to obtain a representative measure of the neutron output produced by the source. The output of the gamma-ray detector is applied uphole by means of a preamplifier 25, amplifier 26, and conductor 27. Power for the downhole electronics is supplied by a power supply 28. One example of such a logging system is described in U.S. Pat. No. 3,686,503 to Wyatt W. Givens, Richard L. Caldwell, and William R. Mills, Jr.

It is the specific feature of the present invention that the assay tool 12 be provided with a housing which enables the tool not only to carry out the assay operation described above, but also to detect the natural gamma radiation of the formations which are to be assayed. In performing this dual function, the gamma-ray detector 15 is firstly operated to locate the formation 10 for carrying out an assaying operation. More particularly, the formation 10 may be selected from the high count rate shown on an initial natural gamma-ray log previously obtained. The assay tool 12 then is lowered into the borehole 11 with the gamma-ray detector 15 in operation. Uphole, the output of the gamma-ray detector 15 is applied to a continuous-trace recorder. The recorder is driven in correlation with depth of the tool 12 in the borehole. Thus, as the tool 12 is lowered, the natural gamma radiation will be recorded on the recorder as a continuous trace. The operator will observe the trace and when there is recorded a high count rate corresponding to that recorded by the initial natural gamma-ray log, the operator will know that the assay tool 12 is at the level of the formation of interest. Lowering of the assay tool 12 will be terminated and assaying operations begun.

Secondly, the gamma-ray detector 15 is operated during the assay operation to detect delayed gamma rays as an indirect measure of the output of the pulsed neutron source 13 as previously described.

Between each assay operation, the gamma-ray detector 15 may again be operated to locate the assay tool 12 at the level of the next formation of interest to be assayed as identified on the initial natural gamma-ray log.

To permit this dual operation of the gamma-ray detector, the assay tool 12 comprises a path 29 in the housing 16 adjacent the neutron and gamma-ray detectors through which the neutrons and gamma rays from the formation pass on their way to the neutron detector 14 and the gamma-ray detector 15. It is a specific feature of the present invention that the material comprising this path has the following characteristics: (a) it is essentially transparent to the passage of both neutrons and gamma rays from the formation to the neutron detector and the gamma-ray detector, respectively, and (b) it does not, upon exposure to neutrons, produce radioisotopes which emit gamma rays which would interfere with the natural gamma rays emitted by the formation.

The first of these characteristics is important in the assaying operation and the second is important in correlating the level of the assay tool with the level of the formation of interest for the assaying operations.

With respect to the first characteristic, the transparency to neutrons of the material forming the path 29 in the housing 16 adjacent the neutron and gamma-ray detectors is related to the thermal neutron-capture cross section of the material. For example, iron used as a housing for the instruments in the logging tool has a high thermal neutron-capture cross section of 2.4 barns and therefore produces two detrimental effects. It not only captures neutrons and prevents them from passing to the neutron detector but also, as a result of this neutron capture, emits gamma rays with an energy in the range of 7 Mev which would interfere with the detection of the delayed gamma rays emitted from the formation during the assay operation. Preferably, the housing would comprise a nonferrous material which has a low thermal neutron-capture cross section. For example, U.S. Pat. No. 3,247,381 to Richard L. Caldwell et al. discloses a radioactive logging system in which a neutron source and a gamma-ray detector are supported within a housing of a nonferrous material such as aluminum, magnesium, zirconium, or beryllium.

The second characteristic relates to the radioactivity of the material forming the path 29 in the housing 16. It is well known in borehole logging that a neutron emitted from the neutron source may proceed in any direction after undergoing either elastic or inelastic scattering in the formation. Most of the scattered neutrons will eventually disappear in the earth. However, a number of these scattered neutrons will re-enter the borehole and strike the assay tool. It is an important feature of the invention that the housing, when struck either by neutrons from the neutron source or by such scattered neutrons, not produce radioactive isotopes which, during the decay process with their characteristic half life, emit gamma rays that would interfere with the natural gamma radiation of the formation. In uranium logging, for example, the natural gamma radiation of uranium in the formation is in the range of about 10 Kev to about 2.5 Mev. It is therefore important in uranium logging that the housing, upon being exposed to neutrons, produces no radioactive decay radiation which would cause interference with the detection of these natural gamma rays. Aluminum, for example, when struck by neutrons having energies exceeding about 2.4 Mev produces several isotopes including sodium-24 having a half life of about 15 hours and strong gamma radiations of about equal intensities at about 1.38 Mev and 2.76 Mev. A path through the housing 16 of a uranium assay tool with a neutron source of 2.4 Mev or greater would therefore, if comprised of aluminum, emit gamma rays which, when detected by the gamma-ray detector 15, would be indistinguishable from the natural gamma rays of the uranium in the formation. Likewise, magnesium would produce interfering radioactive decay radiation.

Preferably, the path in the housing adjacent the neutron and gamma-ray detectors will be comprised of zirconium or beryllium. Both are essentially transparent to the passage of neutrons and gamma rays and, in addition, produce essentially no radioactive decay radiation when struck by neutrons.

The method and apparatus of the present invention are particularly suitable for use in an assay operation in which several successive assays are to be carried out within a relatively short period of time. For example, if the material forming the path through the housing adjacent the detectors was subject to being made radioactive by scattered neutrons, it would become radioactive during the first assay operation. The period of time during which the material forming the path through the housing would remain radioactive to such an extent as to interfere with the location of the assay tool to the next level of interest as indicated on the initial natural gamma-ray log (either in the same or a different borehole) would depend upon the characteristic half life of the radioisotope produced. Such a period of time could vary from several minutes to several hours, depending upon the radioisotope.

In an alternate embodiment, the assay operation for a given borehole may be a continuous one in which the assay tool continuously traverses the borehole. In such an operation, the material forming the path through the housing adjacent the detectors, if subject to being made radioactive by neutrons during the assay operation, would remain radioactive for the entire assay of the borehole. The method and apparatus of the present invention would be particularly useful in such an alternate embodiment to permit the continuous correlation of the level of the assay tool with the natural gamma-ray log.

Alternatively, in the event no initial natural gamma-ray log has been previously produced for selecting a formation to be assayed, the assay tool of the present invention may be lowered through the borehole with the gamma-ray detector in operation and the natural gamma radiation output continuously monitored to select a formation of interest. When such a formation is detected, the lowering of the assay tool may be stopped and the assay operation carried out.

In a further embodiment, the entire housing of the logging tool may be preferably comprised of a material such as zirconium or beryllium having the dual characteristics described herein.

Various modifications to the disclosed embodiments, as well as alternate embodiments, may become apparent to one skilled in the art without departing from the scope and spirit of the invention as hereinafter defined by the appended claims.

What is claimed is:

1. In the method of logging the formations traversed by a borehole in which assay operations are carried out by:
   a. cyclically operating a neutron source to irradiate the formations surrounding the borehole with bursts of neutrons,
   b. operating a neutron detector over a time interval between bursts of neutrons from said neutron source during which said neutrons have disappeared but delayed neutrons are being emitted from the formations, thereby detecting the quantity of delayed neutrons emitted during said time interval, and
   c. operating a gamma-ray detector which is located sufficiently close to said neutron source and said neutron detector so as to detect delayed gamma rays emitted from oxygen in the formations when irradiated with neutrons during each burst of said neutron source, the quantity of said delayed gamma rays being representative of the quantity of neutrons produced by said neutron source, the improvement comprising the step of:
   operating said gamma-ray detector between each assay operation to detect the natural gamma rays from the formation at the level at which an assay operation is carried out, the path adjacent said neutron detector and said gamma-ray detector through which said delayed neutrons and said delayed gamma rays pass during assay operations and through which said natural gamma rays pass between assay operations comprising a material having the following characteristics:
   i. is essentially transparent to the passage of neutrons, delayed gamma rays, and natural gamma rays, and
   ii. will not become activated upon exposure to neutrons during the assay operation to produce radioisotopes which, upon decay with their characteristic half life, would produce gamma radiation that would interfere with the detection of the natural gamma rays between assay operations.

2. The method of claim 1 wherein the neutrons and gamma rays are detected by way of a path consisting of zirconium.

3. The method of claim 1 wherein the neutrons and gamma rays are detected by way of a path consisting of beryllium.

* * * * *

UNITED STATES PATENT OFFICE
CERTIFICATE OF CORRECTION

Patent No. 3,825,753  Dated July 23, 1974

Inventor(s) Wyatt W. Givens

It is certified that error appears in the above-identified patent and that said Letters Patent are hereby corrected as shown below:

Abstract page, in the title, line 2, "LAG" should be --LOG--.
Column 1, line 2, (in the title), "LAG" should be --LOG--, line 22, Equation (1) should read:

$$-- O^{16}(n,p)N^{16} \xrightarrow{\beta^-} O^{16} + \gamma --.$$

Column 3, line 20, Equation (2) should read:

$$-- O^{17}(n,p)N^{17} \xrightarrow{\beta^-} O^{17} \rightarrow O^{16} + n --;$$

line 42, Equation (3) should read:

$$-- O^{16}(n,p)N^{16} \xrightarrow{\beta^-} O^{16} + \gamma --.$$

Signed and sealed this 5th day of November 1974.

(SEAL)
Attest:

McCOY M. GIBSON JR.
Attesting Officer

C. MARSHALL DANN
Commissioner of Patents